(No Model.)
T. C. BOYD & J. J. WADE.
WASH BOWL.
No. 380,082. Patented Mar. 27, 1888.
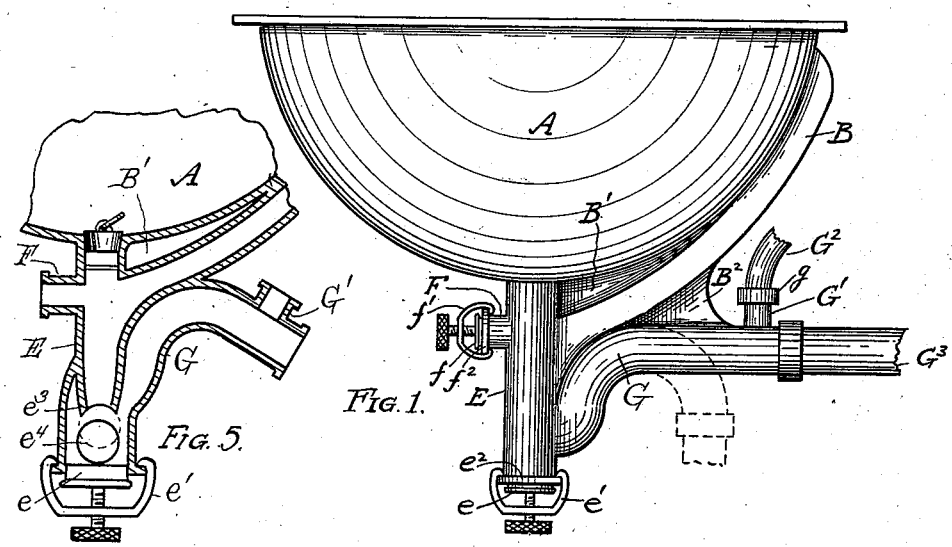
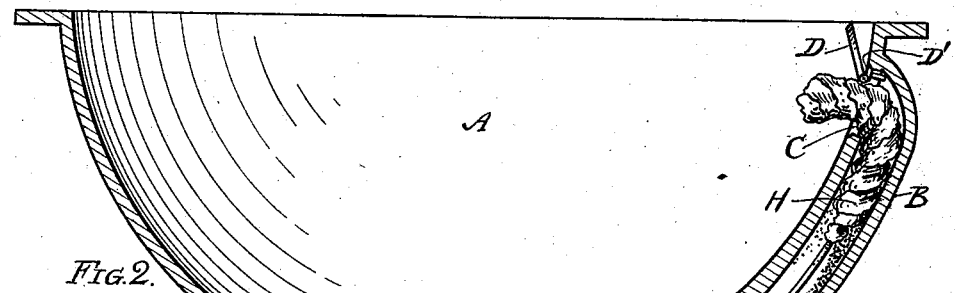
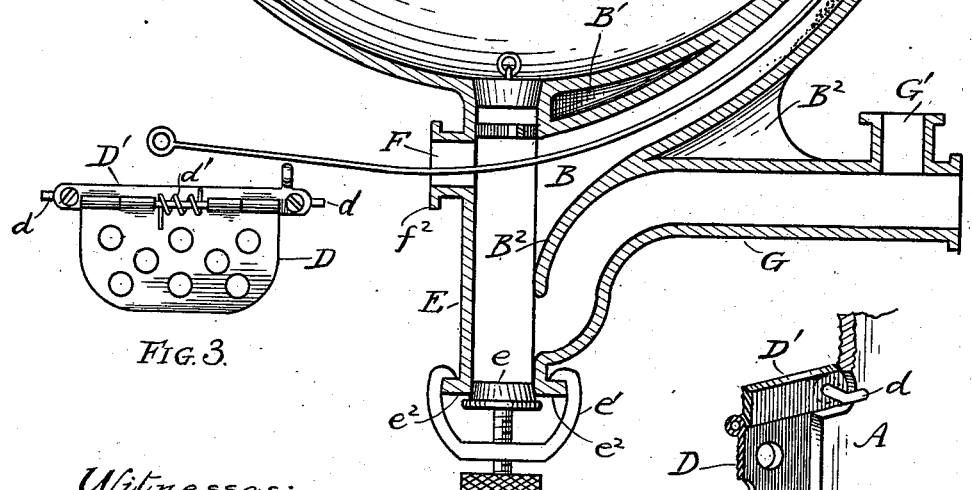
Witnesses:
J. B. Halpenny.
David Stevens.
Inventor:
Thomas C. Boyd
James J. Wade,
By Kindly & Dutcher
their Attys.

UNITED STATES PATENT OFFICE.

THOMAS C. BOYD AND JAMES J. WADE, OF CHICAGO, ILLINOIS.

WASH-BOWL.

SPECIFICATION forming part of Letters Patent No. 380,082, dated March 27, 1888.

Application filed October 15, 1887. Serial No. 252,419. (No model.)

*To all whom it may concern:*

Be it known that we, THOMAS C. BOYD and JAMES J. WADE, of Chicago, in the county of Cook and State of Illinois, have invented certain new and useful Improvements in Wash-Bowls, of which the following is a description, reference being had to the accompanying drawings, forming a part of this specification, in which—

Figure 1 is a side view of our improved bowl. Fig. 2 is a vertical sectional view of the same, cut through the trap and overflow-duct. Fig. 3 is a face view in detail of the hinged strainer at the mouth of the overflow. Fig. 4 is a rear detail view of a portion of the same, and Fig. 5 is a detail view showing a modification of the trap.

Like letters of reference indicate like parts in the different figures.

In stationary wash-bowls as heretofore constructed the overflow-duct has been molded or formed upon the outside of the bowl and connected directly with the waste-pipe, and a permanent rigid strainer formed in the bowl, which has rendered it impossible to clean the duct and remove the impurities which are constantly accumulating therein.

The object of our invention is to construct a bowl and trap in one piece, and in such a way that all parts of the same may be cleaned and purified when necessary by persons of ordinary skill. We accomplish said object in the manner hereinafter more particularly described and claimed.

A in the drawings represents a wash-bowl, preferably made of porcelain, upon one side of which is formed an overflow-duct, B, communicating at the top with an opening, C, Fig. 2, which is normally protected by means of a hinged strainer, D, as hereinafter more fully described.

E is an elongated waste-outlet, which is formed integral with the bowl, and the overflow-duct B is arranged to communicate therewith. In making said connection the duct B is caused to diverge from the bowl as it approaches said waste-outlet, thereby leaving a web, B', between the two, and the bottom and lower end, B², Fig. 2, of the duct is carried downwardly at a sharper curve than its top, for the purposes hereinafter specified. Opposite the duct B in the pipe E is a short pipe or neck, F, which is normally closed by means of a plug, $f$, retained in position by means of a screw-clamp, $f'$, secured to a flange, $f^2$, upon said pipe. An opening in the lower end of the pipe E is normally closed in like manner by means of a plug, $e$, and clamp $e'$, attached to flanges $e^2$.

Communicating with the pipe E at or near its lower end is a pipe, G, which is curved upwardly to conform to the curve of the part B², whence it is preferably carried horizontally, as shown in Figs. 1 and 2, or downwardly, as indicated in dotted lines in Fig. 1. B² is a web formed between the part B and pipe G to strengthen the latter. G' is a short pipe formed upon the top of the pipe G, to which a vent-pipe, G², Fig. 1, to prevent siphonage, may be attached by means of a "union," $g$. The waste-pipe G³, Fig. 1, may be attached in like manner to the pipe G.

It will be seen that the joining of the pipes E and G in the manner shown, in conjunction with the part B², serves to form a trap between the waste-pipe and bowl, while by means of the pipe F and the opening in the lower end of the pipe E a swab, H, Fig. 2, may be inserted and all the impurities in the interior of the overflow-duct and trap may be removed. To effect this result and to permit the swab to be drawn through the duct, we hinge the strainer D to the opening C as follows: D' is a metal plate, which is secured within a suitable recess within the bowl by means of bent hooks $d$ $d$, which, when the plate is inserted in position, are turned by means of a screw-driver to clasp the walls of the bowl A. The strainer D, being hinged to the plate D', is retained normally closed by means of a spring, $d'$, Fig. 3, and may be opened at any time to introduce the swab.

In the modification shown in Fig. 5 a valve-seat, $e^3$, is formed in the pipe E, beneath which, in said pipe E, may be inserted a ball or float valve, $e^4$.

Having thus described our invention, we claim—

1. The combination, with a wash-bowl, of the depending pipe E, having openings at the bottom and side, respectively, each closed by removable caps, upwardly-curved pipe G, communicating therewith at or near the bottom, overflow-duct B, extending from an opening communicating with the top of the bowl downwardly to a point opposite the opening in the top of the pipe E, and the depending part $B^2$, said bowl, pipes, and duct being integral with each other and constructed and arranged substantially as shown and described.

2. The combination of the bowl A, pipes E and G, and duct B, integral with each other, a capped opening upon the side of the pipe E opposite the mouth of the duct, a capped opening at the bottom of said pipe, vent $G'$, part $B^2$, and hinged strainer D, substantially as shown and described.

THOMAS C. BOYD.
JAMES J. WADE.

Witnesses:
D. H. FLETCHER,
J. B. HALPENNY.